United States Patent
Kuo (10) Patent No.: US 11,170,960 B2
(45) Date of Patent: Nov. 9, 2021

(54) ELECTROMAGNETIC RELAY

(71) Applicant: EXCEL CELL ELECTRONIC CO., LTD., Taichung (TW)

(72) Inventor: Ming-Chang Kuo, Taichung (TW)

(73) Assignee: EXCEL CELL ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 16/886,096

(22) Filed: May 28, 2020

(65) Prior Publication Data

US 2021/0005414 A1 Jan. 7, 2021

(30) Foreign Application Priority Data

Jul. 3, 2019 (TW) .................................. 108123451

(51) Int. Cl.
| | | |
|---|---|---|
| *H01H 50/18* | (2006.01) | |
| *H01H 50/54* | (2006.01) | |
| *H01H 50/14* | (2006.01) | |
| *H01H 50/64* | (2006.01) | |
| *H01H 50/02* | (2006.01) | |

(52) U.S. Cl.
CPC ............ *H01H 50/54* (2013.01); *H01H 50/02* (2013.01); *H01H 50/14* (2013.01); *H01H 50/18* (2013.01); *H01H 50/645* (2013.01)

(58) Field of Classification Search
CPC .............................. H01H 50/645; H01H 50/54
USPC ........................................................ 335/128
See application file for complete search history.

(56) References Cited

U.S. PATENT DOCUMENTS

| | | | | |
|---|---|---|---|---|
| 2,235,391 A | * | 3/1941 | Williams | H01H 50/645 335/277 |
| 4,596,972 A | * | 6/1986 | Knight | H01H 50/36 335/128 |
| 4,924,197 A | * | 5/1990 | Siepmann | H01H 1/54 335/128 |
| 5,051,716 A | * | 9/1991 | Stribel | H01H 50/36 335/281 |
| 5,903,201 A | * | 5/1999 | Reiss | H01H 50/026 335/128 |
| 8,432,241 B2 | * | 4/2013 | Schneider | H01H 50/60 335/83 |
| 8,487,723 B2 | * | 7/2013 | Schneider | H01H 1/5822 335/196 |

* cited by examiner

*Primary Examiner* — Alexander Talpalatski
(74) *Attorney, Agent, or Firm* — Birch, Stewart, Kolasch & Birch, LLP (57) ABSTRACT

An electromagnetic relay includes a magnetic attractive member magnetically attractable by an electromagnet unit, and a conductive resilient plate connected to the magnetic attractive member and having a movable portion fixed to the magnetic attractive member, and a movable contact being urged to contact with a first stationary contact. A flexible conductive member is connected to the conductive resilient plate. When the electromagnetic unit is energized and attracts the magnetically attractive member to move the conductive resilient plate therealong, the movable contact contacts with a second stationary contact. When the electromagnetic unit is de-energized, the movable contact contacts with the first stationary contact.

7 Claims, 7 Drawing Sheets

ELECTROMAGNETIC RELAY

CROSS-REFERENCE TO RELATED APPLICATION

This application claims priority to Taiwanese Patent Application No. 108123451, filed on Jul. 3, 2019.

FIELD

The disclosure relates to an electromagnetic relay that can increase an allowable current.

BACKGROUND

Figure 1:
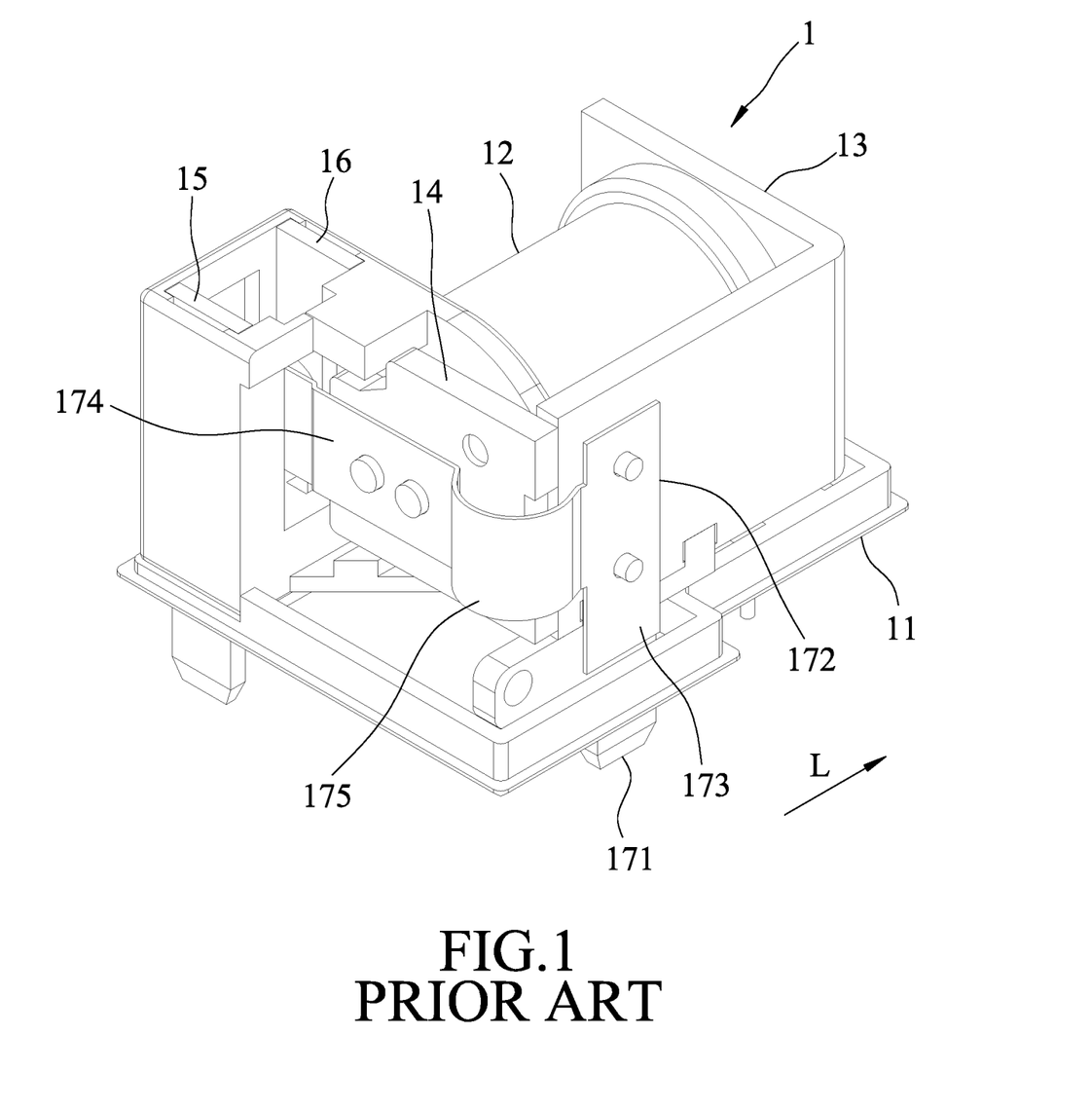
FIG. 1 is a perspective view of an existing electromagnetic relay.
Figure 2:
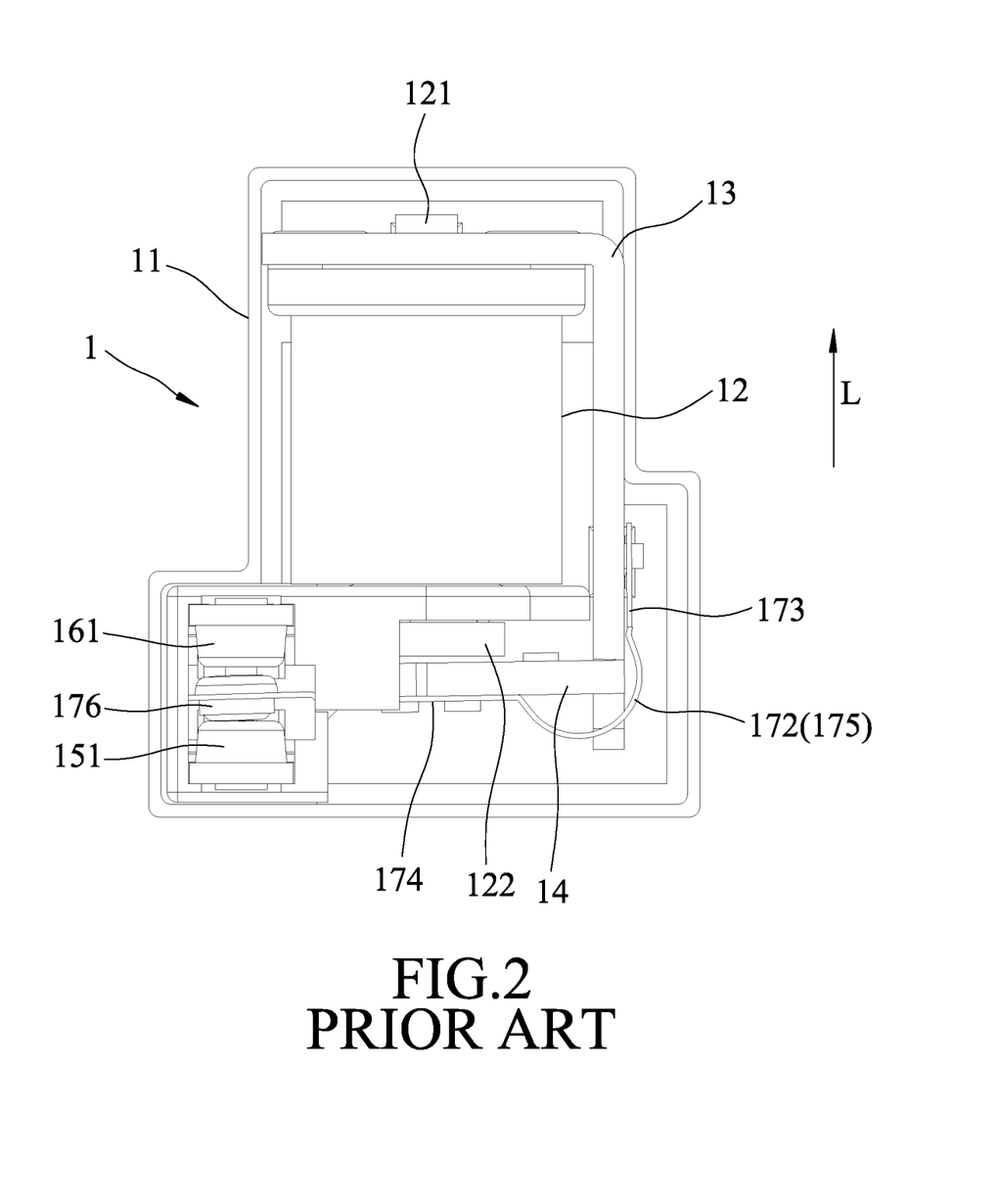
FIG. 2 is a top view of the existing electromagnetic relay.

FIGS. 1 and 2 illustrate an existing electromagnetic relay 1 that controls on or off of a large current by a small current. The electromagnetic relay 1 includes abase 11, an electromagnet 12, a fixing plate 13, a magnetic attractive member 14, a first terminal member 15, a second terminal member 16, and a movable terminal member 17. The electromagnet 12 is mounted to the base 11 along a longitudinal direction (L), and is used to generate an electromagnetic force when energized. The electromagnet 12 has first and second ends 121, 122 opposite to each other along the longitudinal direction (L). The fixing plate 13 is first fixed to the first end 121 and is then bent to extend toward the second end 122. The magnetic attractive member 14 is pivoted to the fixing plate 13 and faces the second end 122 to be attracted by the electromagnet 12. The first and second terminal members 15, 16 are spaced apart from each other along the longitudinal direction (L) and extend through the base 11. The first terminal member 15 has a first contact 151. The second terminal member 16 has a second contact 161 facing the first contact 151. The movable terminal member 17 has a terminal leg 171 extending through the base 11, and a resilient plate 172 resiliently connected to the terminal leg 171 and the fixing plate 13. The resilient plate 172 has a straight segment 173 fixed to the fixing plate 13, a resilient segment 174 fixed to the magnetic attractive member 14, a curved segment 175 interconnecting the straight and resilient segments 173, 174, and a movable contact 176 formed on the resilient segment 174 and located between the first and second contacts 151, 161. Through the curved segment 175, the resilient segment 174 can push the movable contact 176 to contact the first contact 151.

When the electromagnet 12 is energized, the magnetic attractive member 14 is magnetically attracted to the second end 122 of the electromagnet 12 and drives the resilient segment 174 of the resilient plate 172 to move until the movable contact 176 contacts the second contact 161, thereby forming a first circuit state. At this time, the resilient plate 172 stores a restoring force. When the electromagnet 12 is de-energized, the magnetic attractive member 14 is released from the second end 122 of the electromagnet 12, and the movable contact 176 is moved to contact the first contact 151 by the restoring force of the resilient plate 172, thereby forming a second circuit state.

Because the resiliency of the resilient plate 172 influences the sensitivity of the existing electromagnetic relay, the resiliency thereof must be maintained, and cannot just rely on increasing the size or thickness of the resilient plate 172 to enhance an allowable current of the existing electromagnetic relay. Application scope of the existing electromagnetic relay is thus limited.

SUMMARY

Therefore, an object of the present disclosure is to provide an electromagnetic relay that has a high sensitivity and that can increase an allowable current.

Accordingly, an electromagnetic relay of this disclosure includes a base, an electromagnetic unit, an armature unit, a first terminal unit, a second terminal unit, and a movable terminal unit. The base includes a base wall extending along a longitudinal direction. The electromagnetic unit is mounted to the base, and includes a fixing end and an activation end opposite to each other in the longitudinal direction. The armature unit is disposed on the base, is connected to the electromagnetic unit, and includes a magnetic attractive member magnetically attractable by the activation end of the electromagnet unit. The first terminal unit is mounted to and extends through the base wall along a top-bottom direction perpendicular to the longitudinal direction, and includes a first stationary contact. The second terminal unit is mounted to and extends through the base wall along the top-bottom direction. The second terminal unit includes a second stationary contact facing the first stationary contact. The movable terminal unit includes a terminal leg extending downwardly through the base wall along the top-bottom direction, a conductive resilient plate, and a first flexible conductive member.

The conductive resilient plate connects the terminal leg and the magnetic attractive member, and extends to a space between the first and second stationary contacts. The conductive resilient plate has an installation portion, a bent portion, a movable portion and a movable contact. The installation portion is disposed on and extends upwardly from the terminal leg. The bent portion extends from the installation portion along the longitudinal direction and bends along a transverse direction transverse to the longitudinal and top-bottom directions. The movable portion extends from the bent portion toward the first and second stationary contacts and is fixed to the magnetic attractive member. The movable contact is disposed on the movable portion between the first and second stationary contacts, and is urged to contact with the first stationary contact. The movable portion and the bent portion are similar in thickness. The movable portion has a length in the top-bottom direction greater than that of the bent portion. The first flexible conductive member is connected to the conductive resilient plate and is electrically coupled to the terminal leg.

When the electromagnetic unit is energized and attracts the magnetically attractive member to move the conductive resilient plate therealong, the conductive resilient plate stores a restoring force and moves together with the first flexible conductive member, and the movable contact contacts with the second stationary contact. When the electromagnetic unit is de-energized, the magnetically attractive member is released from the electromagnetic unit, and the movable contact contacts with the first stationary contact by the restoring force of the conductive resilient plate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
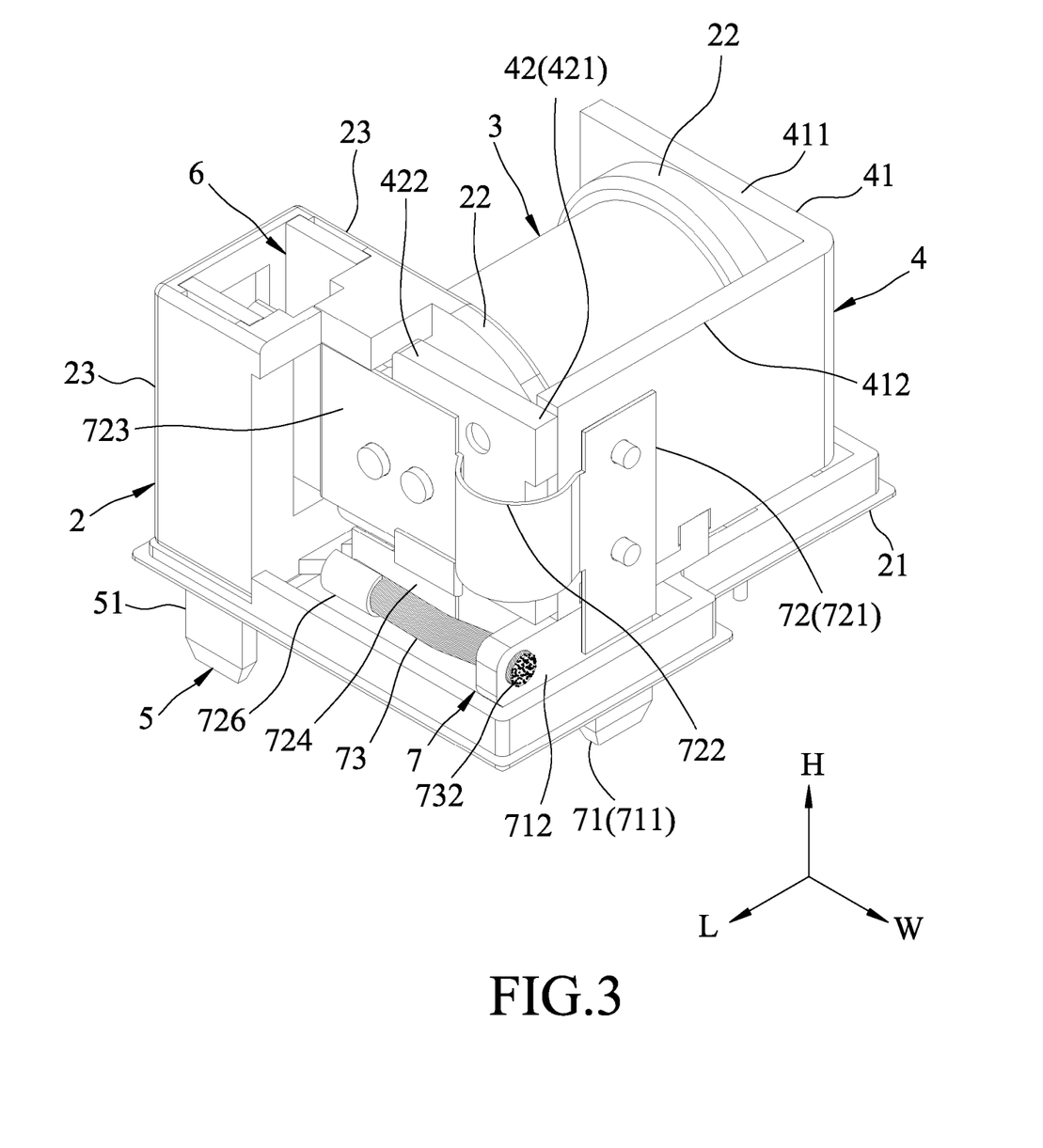
FIG. 3 is a perspective view of an electromagnetic relay according to a first embodiment of the present disclosure.
Figure 4:
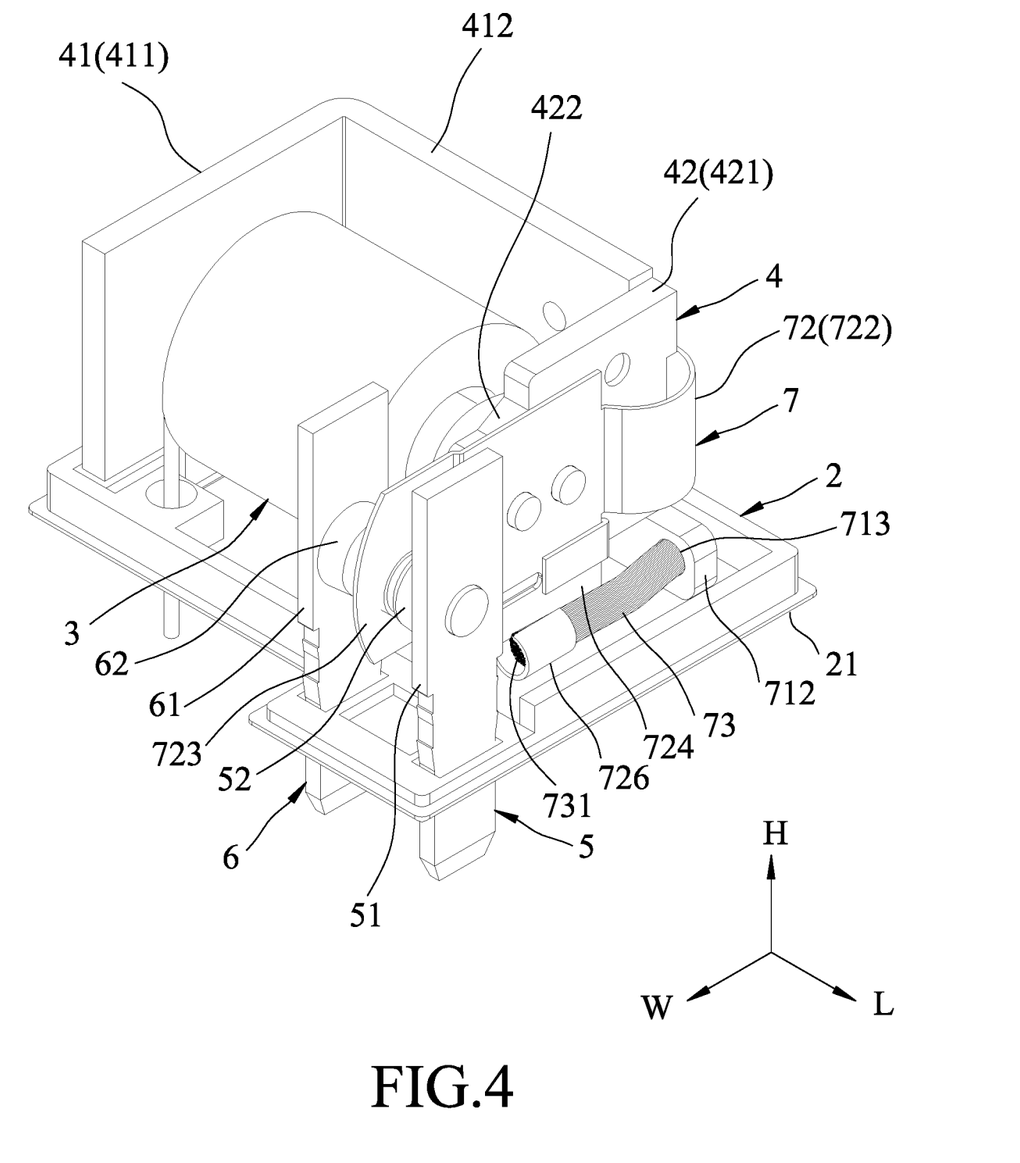
FIG. 4 is a view similar to FIG. 3, but taken from another angle with some parts removed for clarity's sake.
Figure 5:
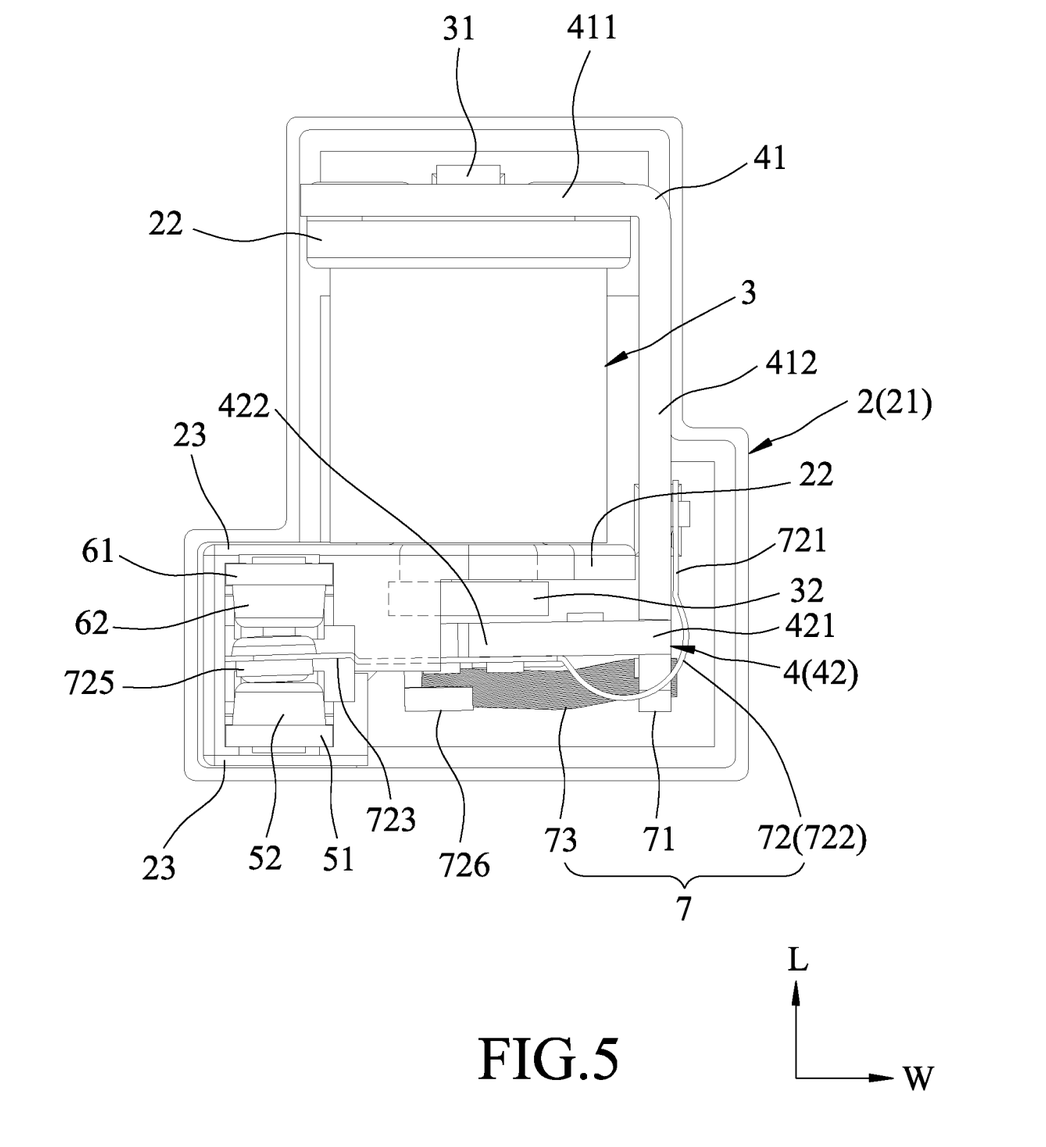
FIG. 5 is a top view of the first embodiment, illustrating a movable contact of a conductive resilient plate in contact with a first stationary contact of a first terminal unit.

Referring to FIGS. 3 to 5, an electromagnetic relay according to a first embodiment of the present disclosure is shown to include a base 2, an electromagnetic unit 3, an armature unit 4, a first terminal unit 5, a second terminal unit 6, and a movable terminal unit 7.

The base 2 includes a base wall 21 extending along a longitudinal direction (L), two insulating walls 22 spaced apart from each other in the longitudinal direction (L) and fixed to and extending from the base wall 21 in a top-bottom direction (H) perpendicular to the longitudinal direction (L), and two upright walls 23 spaced apart from each other in the longitudinal direction (L) and extending from the base wall 21 in the top-bottom direction (H). One of the upright walls 23 is integrally connected to one of the insulating walls 22.

The electromagnetic unit 3 is used to generate an electromagnetic force when energized, is mounted to the base 2, and includes a fixing end 31 and an activation end 32 opposite to each other in the longitudinal direction (L). The fixing and activation ends 31, 32 are respectively fixed to the insulating walls 22.

The armature unit 4 is disposed on the base 2 and is connected to the electromagnetic unit 3. The armature unit 4 includes a fixing member 41 abutting against one of the insulating walls 22 and connected to the fixing end 31 of the electromagnetic unit 3, and a magnetic attractive member 42 proximate to and magnetically attractable by the activation end 32 of the electromagnet unit 3. The fixing member 41 has a fixing wall 411 extending along a transverse direction (W) transverse to the longitudinal and top-bottom directions (L, H) and connected to the fixing end 31, and a connection wall 412 bending from the fixing wall 411 and extending along the longitudinal direction (L). The magnetic attractive member 42 is pivoted to the connection wall 412. Specifically, the magnetic attractive member 42 has a pivot portion 421 pivotally connected to one end of the connection wall 412 which is distal to the fixing wall 411, and a magnetic attractive portion 422 extending along the transverse direction (W) from the pivot portion 421 and facing the activation end 32 of the electromagnetic unit 3.

The first terminal unit 5 is mounted to one of the upright walls 23, and includes a first stationary terminal leg 51 extending through the base wall 21 along the top-bottom direction (H), and a first stationary contact 52 formed on a top portion of the first stationary terminal leg 51.

The second terminal unit 6 is mounted to the other upright wall 23, and includes a second stationary terminal leg 61 extending through the base wall 21 along the top-bottom direction (H), and a second stationary contact 62 formed on a top portion of the second stationary terminal leg 61 and facing the first stationary contact 52 in the longitudinal direction (L). The second stationary contact 62 is spaced apart from the activation end 32 of the electromagnetic unit 3 in the transverse direction (W).

The movable terminal unit 7 includes a terminal leg 71, a conductive resilient plate 72, and a first flexible conductive member 73. The terminal leg 71 has a terminal end portion 711 extending downward through the base wall 21 along the top-bottom direction (H), and a connection portion 712 connected to a top side of the terminal end portion 711 and extending along the longitudinal direction (L) on the base 2. The connection portion 712 has a through hole 713.

The conductive resilient plate 72 connects the terminal leg 71 and the magnetic attractive member 42, and extends to a space between the first and second stationary contacts 52, 62. The conductive resilient plate 72 has an installation portion 721, a bent portion 722, a movable portion 723, an extension portion 724, and a movable contact 725. The installation portion 721 is riveted to and placed in abutment with the connection wall 412 of the fixing member 41, and is disposed on and extends upwardly from of the terminal leg 71. The bent portion 722 arcuately extends from the installation portion 721 and bends around an outer side of the pivot portion 421 along the transverse direction (W). The movable portion 723 extends from the bent portion 722 toward the first and second stationary contacts 52, 62, and is riveted to and placed in abutment with the magnetic attractive portion 422 of the magnetic attractive member 42. The installation portion 721, the bent portion 722, and the movable portion 723 are integrally formed in a one-piece construction and are similar in thickness. The movable portion 723 has a length in the top-bottom direction (H) greater than that of the bent portion 722. Therefore, the movable portion 723 has a conductive cross-sectional area greater than that of the bent portion 722. The extension portion 724 extends from the movable portion 723 along the top-bottom direction (H), and has a crimping sleeve 726 curling upward and spaced apart from and facing the through hole 713 in the terminal leg 71 along the transverse direction (W). The movable contact 725 is disposed on the movable portion 723 between the first and second stationary contacts 52, 62, and is urged to contact with the first stationary contact 52.

The first flexible conductive member 73 is electrically coupled to the connection portion 712 of the terminal leg 71 and is connected to the conductive resilient plate 72. Further, the first flexible conductive member 73 has opposite first and second ends 731, 732 respectively connected to the crimping sleeve 726 and the through hole 713. Specifically, the first end 731 is crimped within the crimping sleeve 726, and the second end 732 is pressfitted within the through hole 713. In this embodiment, the first flexible conductive member 73 is a copper braided wire cable. In other embodiments, the first flexible conductive member 73 may be a flexible metal strip or strap. Although the flexibility of a metal braided wire is better, the conductivity of the copper braided wire is the best. By virtue of the conductivity of the first flexible conductive member 73, and in cooperation with the increase in the conductive cross-sectional area of the movable portion 723, an allowable current of the electromagnetic relay of this disclosure can be enhanced.

Figure 6:
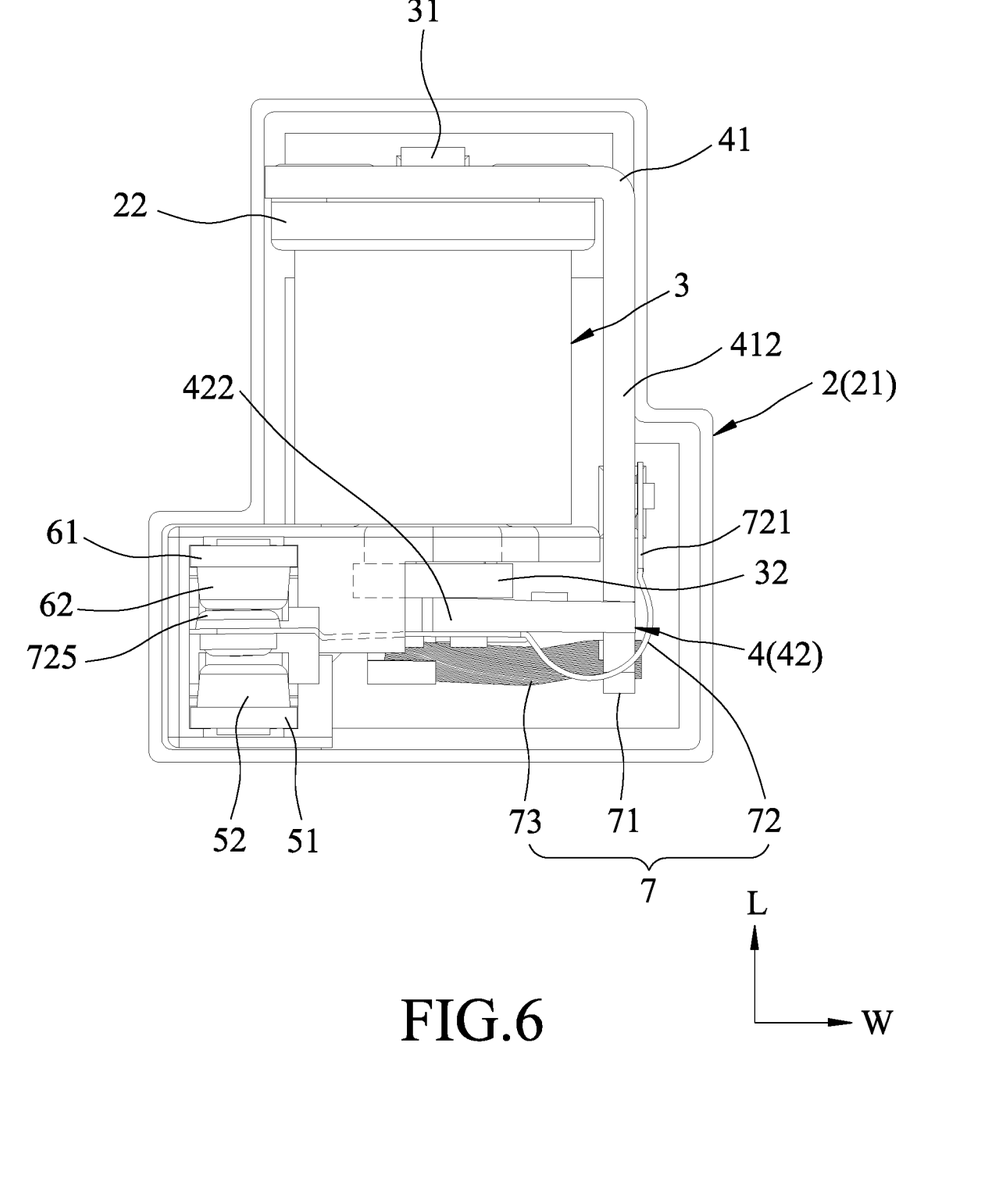
FIG. 6 is a view similar to FIG. 5, but illustrating the movable contact of the conductive resilient plate in contact with a second stationary contact of a second terminal unit.

As shown in FIG. 6, when the electromagnetic unit 3 is energized, the second end 32 of the electromagnetic unit 3 attracts the magnetically attractive member 42 to move the conductive resilient plate 72 therealong, and the conductive resilient plate 72, in turn, drives the first flexible conductive member 73 to move until the movable contact 725 contacts the second stationary contact 62, thereby forming a first circuit state. At this time, the bent portion 722 of the conductive resilient plate 72 is bent and stores a restoring force. As shown in FIG. 5, when the electromagnetic unit 3 is de-energized, the magnetically attractive member 42 is released from the second end 32 of the electromagnetic unit 3, and the restoring force of the bent portion 722 is released, so that the movable contact 725 contacts the first stationary contact 52, thereby forming a second circuit state.

Through the aforesaid description, the advantages of the electromagnetic relay of the first embodiment can be summarized as follows:

1. By increasing the length of the movable portion 723, the conductive cross-sectional area thereof is increased, and by providing the first flexible conductive member 73, the allowable current of the electromagnetic relay of this disclosure can be increased.

2. The length of the movable portion 723 in the top-bottom direction (H) is greater than that of the bent portion 722. By increasing the length of the movable portion 723, and without changing the size and thickness of the bent portion 722, the resiliency of the bent portion 722 can be maintained. Therefore, the electromagnetic relay of this disclosure can have a high sensitivity.

3. Because the first flexible conductive member 73 is a copper braided wire cable, the moving resistance thereof is low. Therefore, under the same induction current driving condition as the prior art, the electromagnetic relay of this disclosure has the function of smooth transition between the first and second circuit states.

Figure 7:
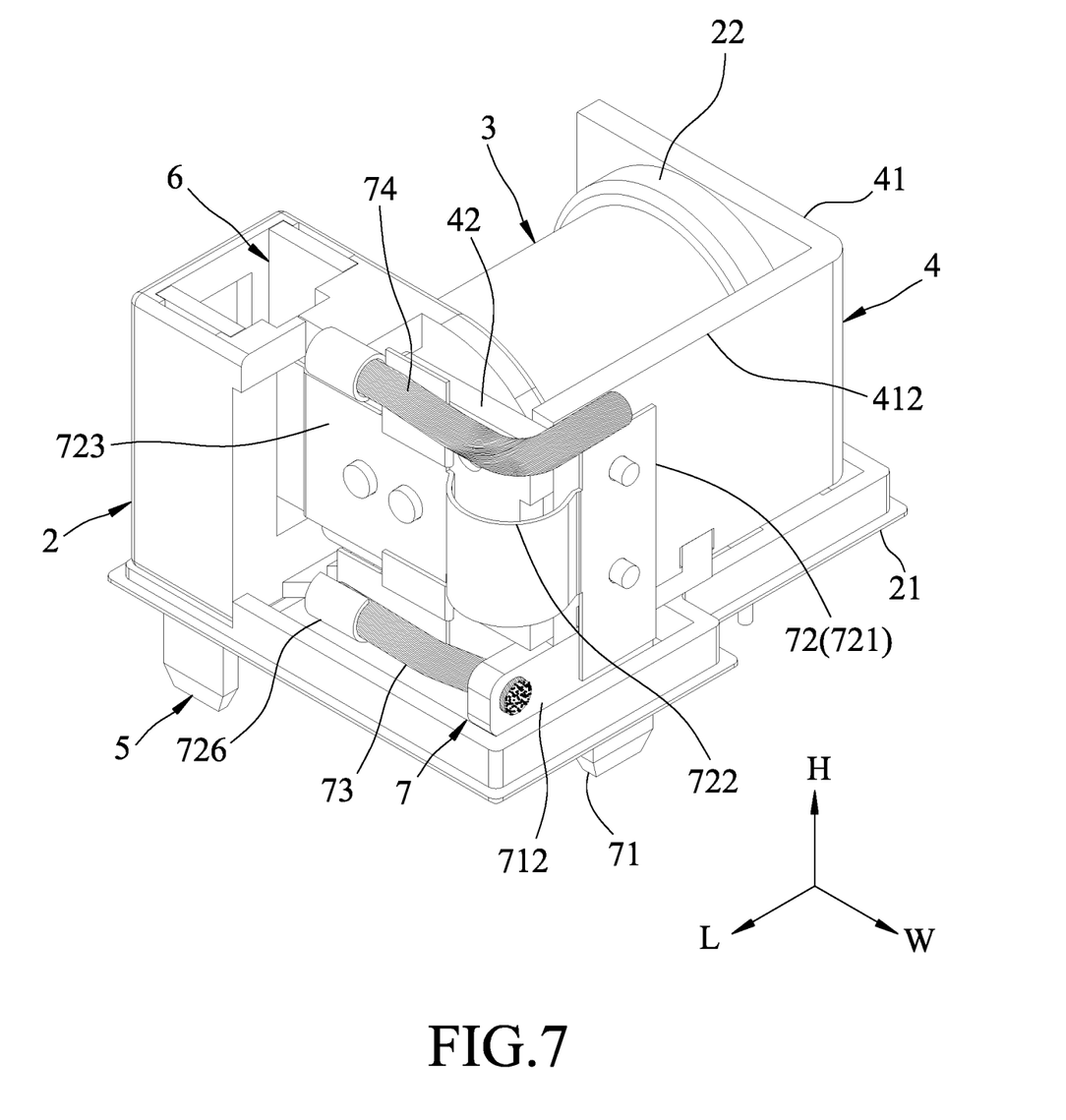
FIG. 7 is a perspective view of an electromagnetic relay according to a second embodiment of the disclosure.

Referring to FIG. 7, a second embodiment of the electromagnetic relay of this disclosure has a structure generally identical to that of the first embodiment. However, in this embodiment, the movable terminal unit 7 further includes a second flexible conductive member 74 spaced apart from the first flexible conductive member 73 along the top-bottom direction (H). The second flexible conductive member 74 is connected to the installation portion 721 of the conductive resilient plate 72 and is curved and fixed to a top end of the movable portion 723. The second flexible conductive member 74 is a copper braided wire cable and is electrically coupled to the terminal leg 71. The advantages of the first embodiment can be similarly achieved using the second embodiment.

In summary, by providing the first flexible conductive member 73 and by increasing the length of the movable portion 723 to increase the conductive cross-sectional area thereof, the allowable current of the electromagnetic relay of this disclosure can be enhanced, and the resiliency of the bent portion 722 is maintained so that the electromagnetic relay of this disclosure has a high sensitivity.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electromagnetic relay, comprising:
a base including a base wall extending along a longitudinal direction;
an electromagnetic unit mounted to said base, and including a fixing end and an activation end opposite to said fixing end in the longitudinal direction;
an armature unit disposed on said base and connected to said electromagnetic unit, said armature unit including a magnetic attractive member magnetically attractable by said activation end of said electromagnet unit;
a first terminal unit mounted to said base and extending through said base wall along a top-bottom direction perpendicular to the longitudinal direction, and including a first stationary contact;
a second terminal unit mounted to said base and extending through said base wall along the top-bottom direction, said second terminal unit including a second stationary contact facing said first stationary contact; and
a movable terminal unit including
a terminal leg extending downwardly through said base wall along the top-bottom direction,
a conductive resilient plate connecting said terminal leg and said magnetic attractive member, and extending to a space between said first and second stationary contacts, said conductive resilient plate having an installation portion, a bent portion, a movable portion and a movable contact, said installation portion being disposed on and extending upwardly from said terminal leg, said bent portion extending from said installation portion and bending along a transverse direction transverse to the longitudinal and top-bottom directions, said movable portion extending from said bent portion toward said first and second stationary contacts and being fixed to said magnetic attractive member, said movable contact being disposed on said movable portion between said first and second stationary contacts, and being urged to contact with said first stationary contact, said movable portion and said bent portion being similar in thickness, said movable portion having a length in the top-bottom direction greater than that of said bent portion, and
a first flexible conductive member connected to said conductive resilient plate and electrically coupled to said terminal leg;
wherein, when said electromagnetic unit is energized and attracts said magnetically attractive member to move said conductive resilient plate therealong, said conductive resilient plate stores a restoring force and moves together with said first flexible conductive member, and said movable contact contacts with said second stationary contact;

wherein, when said electromagnetic unit is de-energized, said magnetically attractive member is released from said electromagnetic unit, and said movable contact contacts with said first stationary contact by the restoring force of said conductive resilient plate;

wherein said terminal leg has a connection portion extending along the longitudinal direction on said base, and a terminal end portion connected to said connection portion and extending downward through said base wall along the top-bottom direction, said first flexible conductive member being connected to said connection portion; and wherein said conductive resilient plate further has an extension portion extending from said movable portion along the top-bottom direction, and having a crimping sleeve, said installation portion of said conductive resilient plate being disposed on said connection portion of said terminal leg, said connection portion having a through hole spaced apart from and facing said crimping sleeve along the transverse direction, said first flexible conductive member having opposite first and second ends respectively connected to said crimping sleeve and said through hole.

2. The electromagnetic relay as claimed in claim 1, wherein said first end of said first flexible conductive member is crimped within said crimping sleeve, and said second end of said first flexible conductive member is pressfitted within said through hole.

3. The electromagnetic relay as claimed in claim 1, wherein said armature unit further includes a fixing member connected to said fixing end of said electromagnetic unit, said magnetic attractive member being pivoted to said fixing member, said fixing member having a fixing wall extending along the transverse direction and connected to said fixing end, and a connection wall bending from said fixing wall and extending along the longitudinal direction, said magnetic attractive member having a pivot portion pivotally connected to said connection wall, and a magnetic attractive portion extending along the transverse direction from said pivot portion and facing said activation end of said electromagnetic unit, said installation portion of said conductive resilient plate being fixed to said connection wall, said bent portion of said conductive resilient plate bending around an outer side of said pivot portion.

4. The electromagnetic relay as claimed in claim 3, wherein said installation portion of said conductive resilient plate is riveted to and placed in abutment with said connection wall of said fixing member.

5. The electromagnetic relay as claimed in claim 3, wherein said movable portion of said conductive resilient plate is riveted to and placed in abutment with said magnetic attractive portion of said magnetic attractive member.

6. The electromagnetic relay as claimed in claim 1, wherein said first flexible conductive member is a copper braided wire cable.

7. The electromagnetic relay as claimed in claim 1, wherein said movable terminal unit further includes a second flexible conductive member spaced apart from said first flexible conductive member along the top-bottom direction, said second flexible conductive member being connected to said conductive resilient plate and being electrically coupled to said terminal leg.

* * * * *